(12) United States Patent
Tarnopolsky

(10) Patent No.: US 7,494,746 B2
(45) Date of Patent: Feb. 24, 2009

(54) ELECTROLYTE FOR RECHARGEABLE LITHIUM BATTERY, AND RECHARGEABLE LITHIUM BATTERY INCLUDING SAME

(75) Inventor: Vasily Tarnopolsky, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/882,612

(22) Filed: Aug. 2, 2007

(65) Prior Publication Data

US 2008/0118843 A1 May 22, 2008

(30) Foreign Application Priority Data

Nov. 20, 2006 (KR) ........................ 10-2006-0114607

(51) Int. Cl.
  *H01M 4/24* (2006.01)
  *H01M 6/04* (2006.01)
  *H01M 6/16* (2006.01)

(52) U.S. Cl. .................... 429/332; 429/101; 429/104; 429/188

(58) Field of Classification Search ............... 429/12–47
See application file for complete search history.

(56) References Cited

U.S. PATENT DOCUMENTS

| 5,494,762 | A | * | 2/1996 | Isoyama et al. ............ 429/221 |
| 6,350,546 | B1 | | 2/2002 | Gan |
| 6,589,697 | B2 | | 7/2003 | Yoshimura |
| 6,939,647 | B1 | | 9/2005 | Jow |
| 2004/0137332 | A1 | * | 7/2004 | Noh et al. .................... 429/329 |
| 2006/0269846 | A1 | | 11/2006 | Xu |
| 2006/0281010 | A1 | | 12/2006 | Lee |
| 2006/0281011 | A1 | | 12/2006 | Lee |

FOREIGN PATENT DOCUMENTS

| EP | 1 585 142 | 10/2005 |
| JP | 2001057237 A * | 2/2001 |
| JP | 2001-283908 | 10/2001 |
| JP | 2004-014351 | 1/2004 |
| JP | 2005-293962 | 10/2005 |
| JP | 2006-024440 | 1/2006 |
| KR | 10-2004-0073076 | 8/2004 |
| KR | 10-2005-0063915 | 6/2005 |
| KR | 10-2005-0068669 | 7/2005 |
| KR | 10-2006-0009193 | 1/2006 |

OTHER PUBLICATIONS

On-line translation of JP 2001-283908.*
Machine Translation of JP,2001-057237, Hibara, Feb. 2001.*
*Search Report* from the European Patent Office issued in Applicant's corresponding European Patent Application No. 07115018.9 date Nov. 6, 2007.

* cited by examiner

*Primary Examiner*—Dah-Wei Yuan
*Assistant Examiner*—Phoebe Riner
(74) *Attorney, Agent, or Firm*—Robert E. Bushnell, Esq.

(57) ABSTRACT

An electrolyte for a rechargeable lithium battery includes a compound represented by Formula 1, a lithium salt, and a non-aqueous organic solvent:

$$A[OSi(C_mH_{2m+1})_3]_3 \qquad (1)$$

wherein A is P or B, and m is an integer ranging from 0 to 6.

25 Claims, 7 Drawing Sheets

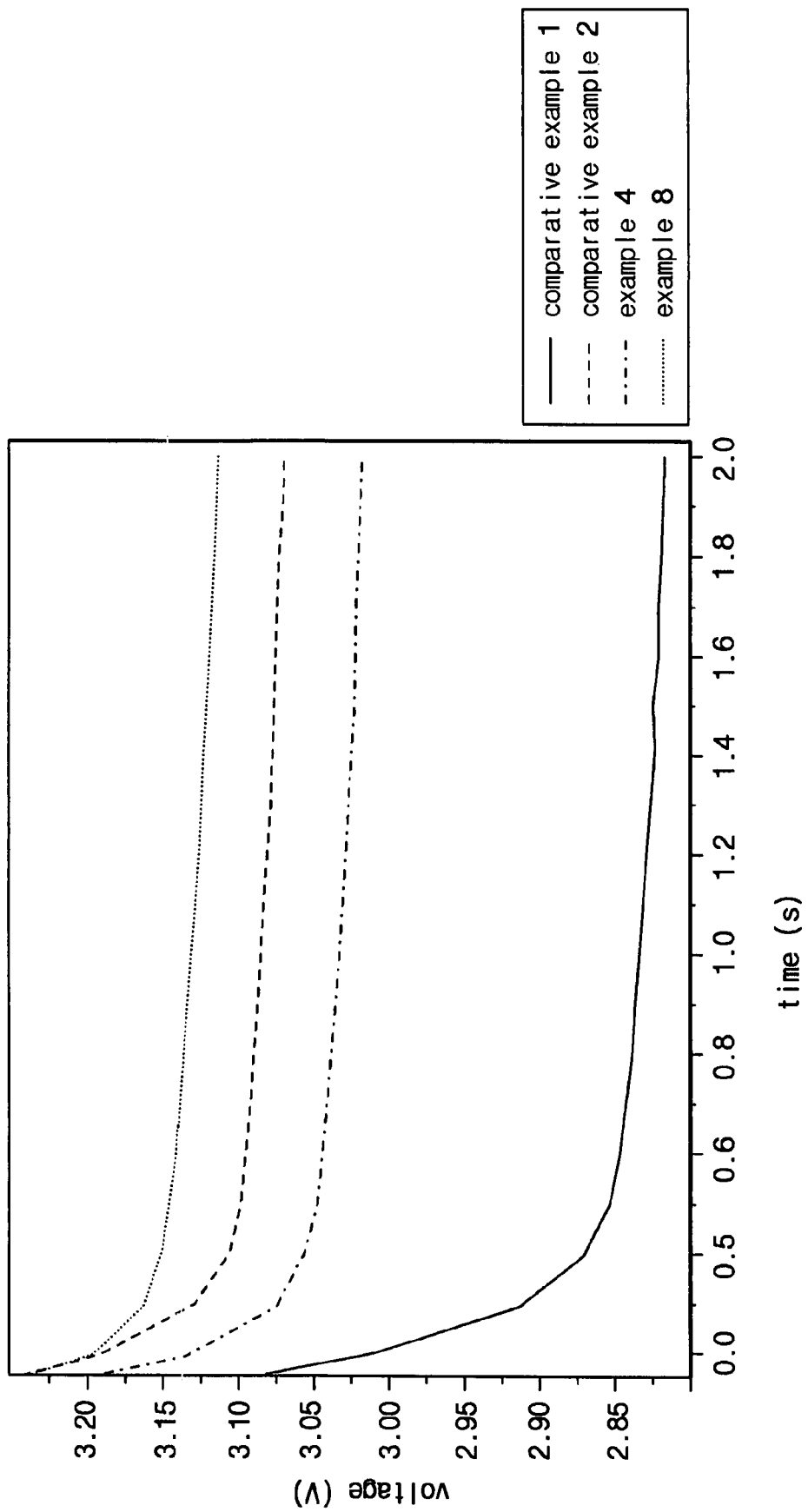

ELECTROLYTE FOR RECHARGEABLE LITHIUM BATTERY, AND RECHARGEABLE LITHIUM BATTERY INCLUDING SAME

CROSS-REFERENCE TO RELATED APPLICATION AND CLAIM OF PRIORITY

This application claims priority to and the benefit of Korean Patent Application No. 10-2006-0114607 filed in the Korean Intellectual Property Office on Nov. 20, 2006, the entire content of which is incorporated herein by reference.

BACKGROUND OF THE INVENTION (a) Field of the Invention

The present invention relates to an electrolyte for a rechargeable lithium battery and a rechargeable lithium battery including the same. More preferably, the present invention relates to an electrolyte for a rechargeable lithium battery that shows excellent output characteristics due to a resistance reduction at a low temperature and a rechargeable lithium battery including the same.

(b) Description of the Related Art

In recent times, due to reductions in size and weight of portable electronic equipment, there has been a need to develop batteries for use in the portable electronic equipment, where the batteries have both high performance and large capacity. Furthermore, it is required that such batteries be produced in a cost effective manner and have improved safety.

Batteries are generally classified as primary batteries, which can be used only once and are then disposed of, and rechargeable batteries, which can be recharged and used repeatedly. Primary batteries include manganese batteries, alkaline batteries, mercury batteries, and silver oxide batteries. Rechargeable batteries include lead-acid storage batteries, nickel-metal hydride (Ni-MH) batteries, sealed nickel-cadmium batteries, lithium metal batteries, lithium ion batteries, lithium polymer batteries, and lithium-sulfur batteries.

Such batteries generate electric power using an electrochemical reaction material (referred to hereinafter simply as the "active material") for a positive electrode and a negative electrode. Important factors for determining battery performance, such as capacity, cycle-life, power, safety, and reliability, include the electrochemical characteristics and the thermal stability of the active material used. Thus, extensive research has been undertaken to improve these factors of positive and negative active materials.

Of the currently available active materials for the negative electrode of the battery, lithium metal has a high electrical capacity per unit mass and high electro-negativity. Thus, lithium metal can be well adapted for use in producing high capacity and high voltage battery cells. However, since it is difficult to assure the safety of a battery using the lithium metal, other materials that can reversibly deintercalate and intercalate lithium ions are being used extensively for the active material of the negative electrodes in rechargeable lithium batteries.

Lithium rechargeable batteries generate electrical energy from changes of chemical potential during the intercalation/deintercalation of lithium ions at the positive and negative electrodes. Lithium rechargeable batteries use materials that reversibly intercalate or deintercalate lithium ions during charge and discharge reactions for both positive and negative active materials, and contain an organic electrolyte or a polymer electrolyte between the positive electrode and the negative electrode.

The electrolyte includes, for example, a cyclic carbonate having a high dielectric constant such as propylene carbonate, ethylene propylene carbonate, and so on, or a linear carbonate having low viscosity such as diethyl propylene carbonate, methylethyl propylene carbonate, dimethyl carbonate, and so on, and mixed solvents thereof.

Such an electrolyte may be decomposed on a surface of an electrically active electrode, and the internal resistance of a battery may be increased by the electrolyte decomposition. Accordingly, charge and discharge characteristics of a battery may be deteriorated and cycle-life is shortened. There has been a need for an electrolyte having excellent cell loading characteristics, low temperature characteristics, charge and discharge cycle characteristics, storage characteristics at high temperature, and so on.

The above information disclosed in this Background section is only for enhancement of understanding of the background of the invention and therefore it may contain information that does not form the prior art that is already known in this country to a person of ordinary skill in the art.

SUMMARY OF THE INVENTION

One embodiment of the present invention provides an electrolyte for a rechargeable lithium battery that shows excellent output characteristics due to reduced resistance at a low temperature.

Another embodiment of the present invention provides a rechargeable lithium battery including the electrolyte.

According to an embodiment of the present invention, provided is an electrolyte for a rechargeable lithium battery that includes a compound represented by the following Formula 1; a lithium salt; and a non-aqueous organic solvent.

$$A[OSi(C_mH_{2m+1})_3]_3 \qquad \text{[Chemical Formula 1]}$$

wherein A is P or B, and m is an integer ranging from 0 to 6.

Examples of the compound represented by Formula 1 includes at least one selected from the group consisting of tris(trimethylsilyl)phosphite, tris(triethylsilyl)phosphite, tris(trimethylsilyl)borate, tris(triethylsilyl)borate, and mixtures thereof.

The compound represented by Formula 1 is present in an amount of 0.01 to 10 wt % based on the total weight of the electrolyte.

According to an embodiment of the present invention, provided is a rechargeable lithium battery that includes the electrolyte, a positive electrode including a positive active material capable of reversibly intercalating and deintercalating lithium ions, and a negative electrode including a negative active material capable of reversibly intercalating and deintercalating lithium ions.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components.

FIG. 7 is a graph showing measurement results of DCIR at a low temperature of cells including the electrolytes according to Examples 4 and 8, and Comparative Examples 1 and 2.

DETAILED DESCRIPTION OF THE EMBODIMENTS

Figure 1:
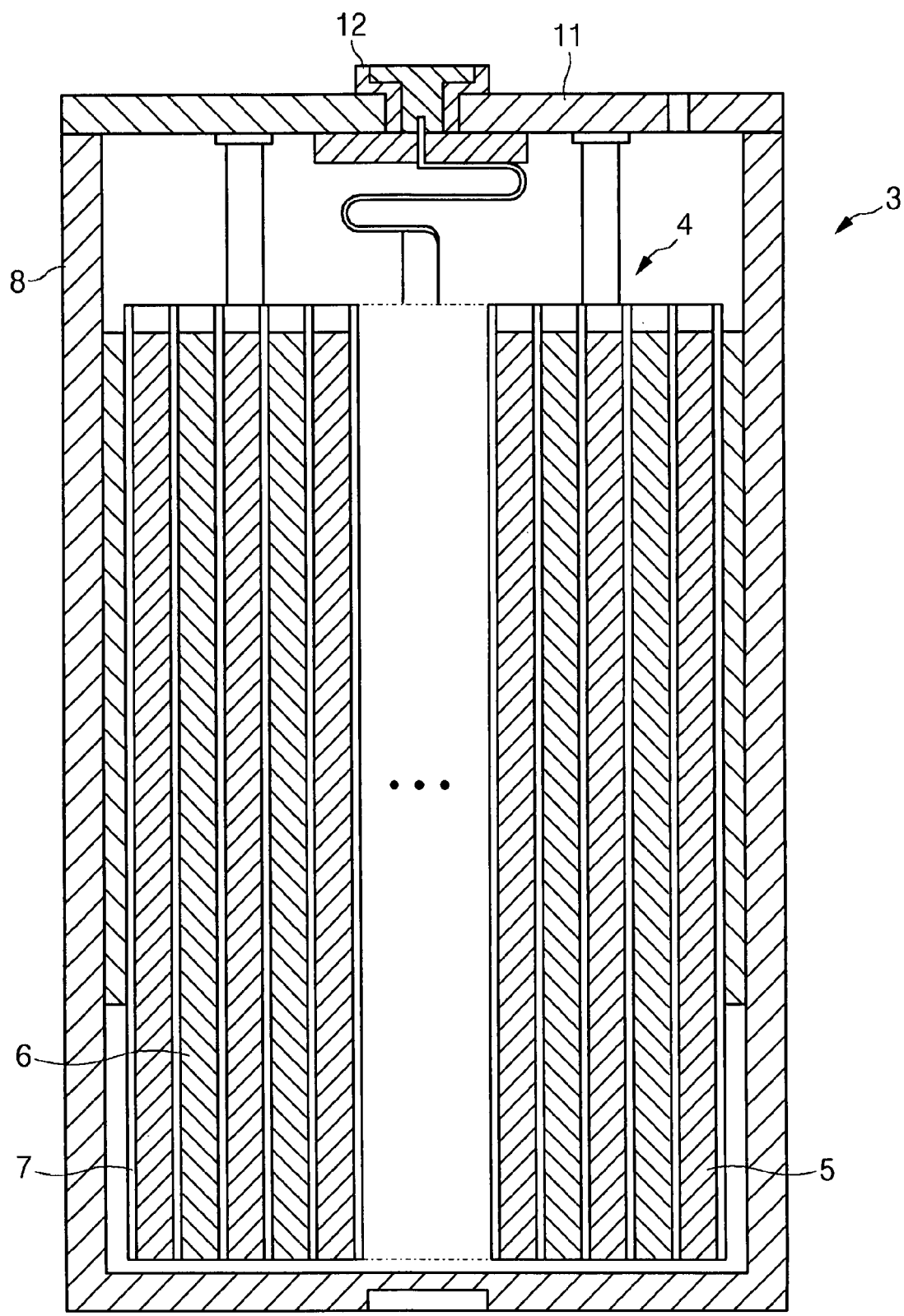
FIG. 1 is a schematic cross-sectional view of a rechargeable lithium battery according to one embodiment of the present invention.

It is important to improve the output characteristic at a low temperature as well as the cycle-life characteristic in order to commercialize a high capacity battery. Particularly, the rechargeable lithium battery including an ethylene carbonate-based electrolyte solution system has a problem of a very low output characteristic at a low temperature. The output characteristic at a low temperature is affected by a solid electrolyte interphase (SEI) layer formed on the surface of an electrode plate due to the decomposition of ethylene carbonate rather than by the ionic conductivity of the electrolyte solution.

According to one embodiment of the present invention, since the electrolyte solution of the rechargeable lithium battery includes an additive of a phosphite-based or borate-based compound, it decreases the low temperature resistance at the low temperature of an SEI layer formed on the surface of the electrode plate to provide a high capacity battery.

The electrolyte according to one embodiment of the present invention includes a compound represented by the following Formula 1, a lithium salt, and a non-aqueous organic solvent:

    [Chemical Formula 1]

$A[OSi(C_mH_{2m+1})_3]_3$ wherein A is P or B, and m is an integer ranging from 0 to 6.

Examples of the compound represented by Formula 1 include at least one selected from the group consisting of tris(trimethylsilyl)phosphite, tris(triethylsilyl)phosphite, tris(trimethylsilyl)borate, tris(triethylsilyl)borate, and mixtures thereof. According to another embodiment, tris(trimethylsilyl)borate may be appropriate because it can produce lithium borate having high conductivity.

The compound represented by Formula 1 is decomposed earlier than the organic solvent at a high rate discharge at a low temperature, and forms an SEI layer including an element A and Si on the surface of the negative electrode to prevent the organic solvent from decomposing. Further, the SEI layer formed on the surface of the negative electrode allows lithium ions to be intercalated on the surface of the electrode. Thereby, the internal resistance is decreased to improve the electrochemical characteristic of the battery.

The compound represented by Formula 1 is present in an amount of 0.01 to 10 wt % based on the total weight of the electrolyte. According to another embodiment, the compound represented by Formula 1 is present in an amount of 0.01 to 5 wt % based on the total weight of the electrolyte. According to yet another embodiment, the compound represented by Formula 1 is present in an amount of 0.3 to 3 wt % based on the total weight of the electrolyte.

When the amount of the compound represented by Formula 1 is less than 0.01 wt %, it is hard to provide a sufficient resistance reduction effect at a low temperature. On the other hand, when it is more than 10 wt %, $CO_2$ generated from the decomposition of the compound represented by Formula 1 may deteriorate battery capacity, cycle-life stability, and cycle characteristic.

The lithium salt is dissolved in the non-aqueous organic solvent to supply lithium ions in the battery. It may facilitate a basic operation of a rechargeable lithium battery, and it allows transmission of lithium ions between positive and negative electrodes.

Non-limiting examples of the lithium salt include at least one selected from the group consisting of $LiPF_6$, $LiBF_4$, $LiSbF_6$, $LiAsF_6$, $LiClO_4$, $LiCF_3SO_3$, $LiC_4F_9SO_3$), $LiN(CF_3SO_2)_2$, $LiN(C_2F_5SO_2)_2$, $LiAlO_4$, $LiAlCl_4$, $LiN(C_pF_{2p+1}SO_2)(C_qF_{2q+1}SO_2)$ (where p and q are natural numbers), $LiSO_3CF_3$, LiCl, and LiI.

The lithium salt may be used at a 0.7 to 2.0M concentration. When the lithium salt concentration is less than 0.7M, electrolyte performance may be deteriorated due to low electrolyte conductivity, whereas when it is more than 2.0M, lithium ion mobility may be reduced due to an increase of electrolyte viscosity.

In the electrolyte, the non-aqueous organic solvent acts as a medium for transmitting ions taking part in the electrochemical reaction of the battery.

The non-aqueous organic solvent may include a carbonate-based, ester-based, ether-based, or ketone-based solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), γ-butyrolactone (γ-BL), and so on. Examples of the ester-based solvent may include n-methyl acetate, n-ethyl acetate, n-propyl acetate, dimethylacetate, methylpropionate, ethylpropionate, decanolide, valerolactone, mevalonolactone, caprolactone, and so on. Examples of the ether-based solvent include dibutyl ether, tetraglyme, diglyme, dimethoxyethane, 2-methyltetrahydrofuran, tetrahydrofuran, and so on. Examples of the ketone-based solvent include cyclohexanone and so on.

The non-aqueous organic solvent may be used singularly or in a mixture comprised of two or more solvents. When the organic solvent is used in a mixture, a mixture ratio may be controlled in accordance with a desirable battery performance.

The carbonate-based solvent may include a mixture of a cyclic carbonate and a linear carbonate. The cyclic carbonate includes, for example, at least one of ethylene carbonate, butylene carbonate, propylene carbonate, γ-butyrolactone, and the like. The cyclic carbonate can easily solvate lithium ions, and thereby can increase ion conductivity of the electrolyte.

The linear carbonate includes, for example, at least one of dimethyl carbonate (DMC), diethyl carbonate (DEC), dipropyl carbonate (DPC), methylpropyl carbonate (MPC), ethylpropyl carbonate (EPC), methylethyl carbonate (MEC), and the like. The linear carbonate has low viscosity and reduces viscosity of the electrolyte resulting in an increase of ion conductivity. However, since the linear carbonate has a low flash point, it may lower a flash point of the electrolyte if added in an excessive amount. The cyclic carbonate and the linear carbonate are mixed together in a volume ratio of 1:1 to 1:9, and when the mixture is used as an electrolyte, the electrolyte performance may be enhanced.

According to another embodiment of the present invention, the electrolyte of the present invention may include mixtures of carbonate-based solvents and aromatic hydrocarbon-based solvents. The carbonate-based solvents and the aromatic hydrocarbon-based solvents are preferably mixed together in the volume ratio of 1:1 to 30:1.

The aromatic hydrocarbon-based organic solvent may be represented by the following Formula 2.

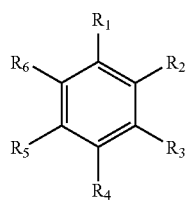

[Chemical Formula 2]

wherein $R_1$ to $R_6$ are independently selected from the group consisting of hydrogen, a halogen, a C1 to C10 alkyl, a haloalkyl, and combinations thereof.

The aromatic hydrocarbon-based organic solvent may include, but is not limited to, at least one selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The electrolyte may further include an additive that can improve cell characteristics. According to an embodiment of the present invention, the additive includes an ethylene carbonate-based compound of the following Formula 3 in order to improve safety of a battery.

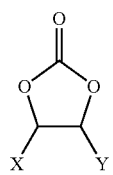

[Chemical Formula 3]

wherein X and Y are independently selected from the group consisting of hydrogen, a halogen, a cyano (CN), a nitro ($NO_2$), and a fluorinated C1 to C5 alkyl, and at least one of X and Y is selected from the group consisting of a halogen, a cyano (CN), a nitro ($NO_2$), and a fluorinated C1 to C5 alkyl.

Examples of the ethylene carbonate-based compound include, but are not limited to, at least on selected from the group consisting of ethylene carbonate, fluoroethylene carbonate, difluoroethylene carbonate, chloroethylene carbonate, dichloroethylene carbonate, bromoethylene carbonate, dibromoethylene carbonate, nitroethylene carbonate, cyanoethylene carbonate, and mixtures thereof. According to one embodiment, fluoroethylene carbonate may be appropriate.

The amount of the ethylene carbonate-based additive is not particularly limited, and can be added in an appropriate amount to implement battery safety.

The electrolyte may further include a monomer and a polymerization initiator that are generally used in a conventional polymer electrolyte.

The electrolyte affects surface chemical characteristics of an electrode at high rate discharging at a low temperature and can thereby reduce resistance at the interface between a positive electrode and the electrolyte, and at the interface between a negative electrode and the electrolyte, and internal resistance of a cell. Resultantly, a reduction of lithium ion conductivity in accordance with a cell thickness increase can be suppressed and thereby battery output at a low temperature can be improved.

The electrolyte for a rechargeable lithium battery according to the embodiment of the present invention can be stable within a temperature range of about −40 to about 60° C., and shows stable characteristics at 4V. The electrolyte can be applicable to all rechargeable lithium batteries such as a lithium ion battery, a lithium polymer battery, and so on.

The electrolyte is prepared by adding a lithium salt and the additive to a non-aqueous organic solvent. The additive can be added to a lithium salt dissolved in an organic solvent, but the addition order of the lithium salt and the additive is not specifically limited.

According to another embodiment, a rechargeable lithium battery including the electrolyte is provided.

The rechargeable lithium battery includes the electrolyte, a negative electrode including a negative active material, and a positive electrode including a positive active material.

Rechargeable lithium batteries may be classified as lithium ion batteries, lithium ion polymer batteries, and lithium polymer batteries according to the presence of a separator and the kind of electrolyte used in the battery. The rechargeable lithium batteries may be formed a variety of shapes and sizes, including cylindrical, prismatic, and coin-type batteries. They may be a thin film battery or be rather bulky in size. Structures and fabricating methods for lithium ion batteries pertaining to the present invention are well known in the art.

FIG. 1 shows a structure of a rechargeable lithium battery according to one embodiment of the present invention.

As shown in FIG. 1, the rechargeable lithium battery 3 is fabricated by providing an electrode assembly including a positive electrode 5 and a negative electrode 6 with a separator 7 interposed between the positive electrode 5 and negative electrode 6, inserting the electrode assembly 4 into a case 8, injecting an electrolyte solution into the upper part of the case 8, and sealing the same with a plate 11 and a gasket 12.

The negative electrode includes a current collector and a negative active material layer including a negative active material disposed on the current collector.

The negative active material may include at least one selected from the group consisting of a material being capable of reversibly forming a compound. Examples of the negative active material include a carbonaceous material such as artificial graphite, natural graphite, graphitized carbon fiber, graphitized mesocarbon microbeads, amorphous carbon, and so on. For the negative active material, a metal being capable of alloying lithium or a composite of a metal and a carbonaceous material can be used. The metal being capable of alloying lithium includes Al, Si, Sn, Ge, Pb, Zn, Ag, Bi, In, Mg, Ga, Cd, Ti, and so on. A lithium metal foil can be also a negative active material.

The negative active material can be included in an amount of 1 to 99 wt % based on the total weight of the negative active material layer. According to one embodiment, the negative active material can be included in an amount of 10 to 98 wt % based on the total weight of the negative active material layer. When the amount of the negative active material is out of the range, capacity may be deteriorated or a relative amount of a binder may be reduced resulting in low adherence between the negative active materials and the current collector.

The negative electrode may be fabricated by a method including mixing the negative active material, a binder, and optionally a conductive agent to provide a composition, and coating the composition on a current collector such as copper for the negative electrode. The negative electrode manufacturing method is well known, and thus is not described in detail in the present specification.

Examples of the binder include, but are not limited to, polyvinylalcohol, carboxylmethylcellulose, hydroxypropylcellulose, diacetylenecellulose, polyvinylchloride, polyvinylpyrrolidone, polytetrafluoroethylene, polyvinylidene fluoride, polyethylene, and polypropylene.

Any electrically conductive material may be used as a conductive agent unless it causes any chemical change. Examples of the conductive agent include natural graphite, artificial graphite, carbon black, acetylene black, ketjen black, carbon fiber, a metal powder or a metal fiber including copper, nickel, aluminum, silver, and so on, a polyphenylene derivative, or combinations thereof.

The solvent can be N-methylpyrrolidone, but it is not limited thereto.

The current collector may be a copper foil, a nickel foil, a stainless steel foil, a titanium foil, a nickel foam, a copper foam, a polymer substrate coated with a conductive metal, or combinations thereof.

The positive electrode includes a positive active material that includes a lithiated intercalation compound that is capable of reversibly intercalating and deintercalating lithium. The positive active material includes a composite oxide including lithium and a metal selected from the group consisting of cobalt, manganese, nickel, and combinations thereof, and is more specifically exemplified by compounds of the following Formulas 4 to 28.

$$Li_a A_{1-b} B_b D_2 \quad \text{[Chemical Formula 4]}$$

wherein, in Formula 4, $0.95 \leq a \leq 1.1$ and $0 \leq b \leq 0.5$.

$$Li_a E_{1-b} B_b O_{2-c} F_c \quad \text{[Chemical Formula 5]}$$

wherein, in Formula 5, $0.95 \leq a \leq 1.1$, $0 \leq b \leq 0.5$, and $0 \leq c \leq 0.05$.

$$LiCo_{2-b} O_{4-c} F_c \quad \text{[Chemical Formula 6]}$$

wherein, in Formula 6, $0 \leq b \leq 0.5$ and $0 \leq c \leq 0.05$.

$$LiMn_{2-b} O_{4-c} F_c \quad \text{[Chemical Formula 7]}$$

wherein, in Formula 7, $0 \leq b \leq 0.5$ and $0 \leq c \leq 0.05$.

$$Li_a Ni_{1-b-c} Co_b B_c D_\alpha \quad \text{[Chemical Formula 8]}$$

wherein, in Formula 8, $0.95 \leq a \leq 1.1$, $0 \leq b \leq 0.5$, $0 \leq c \leq 0.05$, and $0 < \alpha \leq 2$.

$$Li_a Ni_{1-b-c} Co_b O_{2-\alpha} F_\alpha \quad \text{[Chemical Formula 9]}$$

wherein, in Formula 9, $0.95 \leq a \leq 1.1$, $0 \leq b \leq 0.5$, $0 \leq c \leq 0.05$, and $0 < \alpha < 2$.

$$Li_a Ni_{1-b-c} Co_b O_{2-\alpha} F_2 \quad \text{[Chemical Formula 10]}$$

wherein, in Formula 10, $0.95 \leq a \leq 1.1$, $0 \leq b \leq 0.5$, and $0 \leq c \leq 0.05$.

$$Li_a Ni_{1-b-c} Mn_b B_c D_\alpha \quad \text{[Chemical Formula 11]}$$

wherein, in Formula 11, $0.95 \leq a \leq 1.1$, $0 \leq b \leq 0.5$, $0 \leq c \leq 0.05$, and $0 < \alpha \leq 2$.

$$Li_a Ni_{1-b-c} Mn_b O_{2-\alpha} F_\alpha \quad \text{[Chemical Formula 12]}$$

wherein, in Formula 12, $0.95 \leq a \leq 1.1$, $0 \leq b \leq 0.5$, $0 \leq c \leq 0.05$, and $0 < \alpha < 2$.

$$Li_a Ni_{1-b-c} Mn_b O_{2-\alpha} F_2 \quad \text{[Chemical Formula 13]}$$

wherein, in Formula 13, $0.95 \leq a \leq 1.1$, $0 \leq b \leq 0.5$, and $0 \leq c \leq 0.05$.

$$Li_a Ni_b E_c G_d O_2 \quad \text{[Chemical Formula 14]}$$

wherein, in Formula 14, $0.90 \leq a \leq 1.1$, $0 \leq b \leq 0.9$, $0 \leq c \leq 0.5$, and $0.001 \leq d \leq 0.1$.

$$Li_a Ni_b Co_c Mn_d G_e O_2 \quad \text{[Chemical Formula 15]}$$

wherein, in Formula 15, $0.90 \leq a \leq 1.1$, $0 \leq b \leq 0.9$, $0 \leq c \leq 0.5$, $0 \leq d \leq 0.5$, and $0.001 \leq e \leq 0.1$.

$$Li_a NiB_b O_2 \quad \text{[Chemical Formula 16]}$$

wherein, in Formula 16, $0.90 \leq a \leq 1.1$ and $0.001 \leq b \leq 0.1$.

$$Li_a CoG_b O_2 \quad \text{[Chemical Formula 17]}$$

wherein, in Formula 17, $0.90 \leq a \leq 1.1$ and $0.001 \leq b \leq 0.1$.

$$Li_a MnG_b O_2 \quad \text{[Chemical Formula 18]}$$

wherein, in Formula 18, $0.90 \leq a \leq 1.1$ and $0.001 \leq b \leq 0.1$.

$$Li_a Mn_2 G_b O_4 \quad \text{[Chemical Formula 19]}$$

wherein, in Formula 4, $0.90 \leq a \leq 1.1$ and $0.001 \leq b \leq 0.1$.

$$HO_2. \quad \text{[Chemical Formula 20]}$$

$$HS_2. \quad \text{[Chemical Formula 21]}$$

$$LiHS_2. \quad \text{[Chemical Formula 22]}$$

$$V_2 O_5. \quad \text{[Chemical Formula 23]}$$

$$LiV_2 O_5. \quad \text{[Chemical Formula 24]}$$

$$LiIO_2. \quad \text{[Chemical Formula 25]}$$

$$LiNiVO_4. \quad \text{[Chemical Formula 26]}$$

$$Li_{3-f} J_2(PO_4)_3 \ (0 \leq f \leq 3). \quad \text{[Chemical Formula 27]}$$

$$Li_{3-f} Fe_2(PO_4)_3 \ (0 \leq f \leq 2). \quad \text{[Chemical Formula 28]}$$

In the above Formulas 4 to 28, A is selected from the group consisting of Ni, Co, Mn, and combinations thereof; B is selected from the group consisting of Al, Ni, Co, Mn, Cr, Fe, Mg, Sr, V, a rare earth element, and combinations thereof; D is selected from the group consisting of O, F, S, P, and combinations thereof; E is selected from the group consisting of Co, Mn, and combinations thereof; F is selected from the group consisting of F, S, P, and combinations thereof; G is selected from the group consisting of Al, Cr, Mn, Fe, Mg, La, Ce, Sr, V, lanthanide element, and combinations thereof; Q is selected from the group consisting of Ti, Mo, Mn, and combinations thereof; I is selected from the group consisting of Cr, V, Fe, Sc, Y, and combinations thereof; and J is selected from the group consisting of V, Cr, Mn, Co, Ni, Cu, and combinations thereof.

The positive active material may be at least one selected from the group consisting of elemental sulfur ($S_8$), and a sulfur-based compound such as $Li_2 S_n (n \geq 1)$, $Li_2 S_n (n \geq 1)$ dissolved in a catholyte, an organic sulfur compound, or a carbon-sulfur polymer $((C_2S_f)_n: f=2.5$ to $50, n \geq 2)$.

The positive electrode can be fabricated as follows: a positive active material composition including the positive active material, a binder, and optionally a conductive agent mixed in a solvent is applied on a positive current collector such as aluminum.

The electrolyte of the rechargeable lithium battery is the same as described above.

As the electrolyte includes the compound represented by Formula 1, it is decomposed earlier than the organic solvent at the high rate discharge to form an SEI layer including an element A and Si on the surface of the negative electrode.

The SEI film is formed on the surface of negative electrode to prevent the negative electrode from directly contacting the electrolyte. Accordingly, the reduction decomposition reaction of the electrolyte is suppressed on the surface of the negative electrode to decrease gas generation due to the decomposition of electrolyte as well as to prevent the electrolyte from undergoing self-deterioration. The gas generation is decrease so that the battery is not deformed and the internal pressure thereof is not increased. Further, since the electrolyte is not deteriorated, the amount of electrolyte is not decreased and the charge and discharge reaction is easily carried out. Thereby, the charge and discharge efficiency is increased and the cycle characteristics are improved.

As the reaction between the electrolyte and the negative electrode is suppressed, the electrolyte is not deteriorated even if the battery cell is stored at a high temperature for a long time. In addition, the charge and discharge efficiency and the cycle characteristics are not deteriorated.

The-SEI film has excellent conductivity of lithium ions, as well as functions of supplying lithium ions between the electrolyte and the negative electrode. Accordingly, even though the surface of the negative electrode is covered with the SEI layer, it does not block supply of lithium ions. Thereby, the charge and discharge reactions are easily performed to increase the charge and discharge efficiency and to improve the cycle characteristics. In addition, the charge and discharge capacity is not remarkably deteriorated while the internal impedance of the battery is not increased.

The rechargeable lithium battery generally includes a positive electrode, a negative electrode, and an electrolyte. The battery may further include a separator as needed. The separator may include any material used in conventional lithium secondary batteries. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene three-layered separator, and a polypropylene/polyethylene/polypropylene three-layered separator.

The following examples illustrate the present invention in more detail. These examples, however, should not in any sense be interpreted as limiting the scope of the present invention.

EXAMPLES 1-10

1M $LiPF_6$ was added to a non-aqueous organic solvent in which ethylene carbonate/ethylmethyl carbonate/dimethyl carbonate (EC/EMC/DMC) were mixed at a volume ratio of 3/4/3, and then the compound represented by Formula 1 was added thereto as shown in the following Table 1 to provide an electrolyte solution.

TMSPi refers to tris(trimethylsilyl)phosphite and TMSB refers to tris(trimethylsilyl)borate.

TABLE 1

| | Compound represented by Formula 1 | Content (wt %) |
|---|---|---|
| Example 1 | TMSPi | 0.5 |
| Example 2 | TMSPi | 1 |
| Example 3 | TMSPi | 2 |
| Example 4 | TMSPi | 3 |
| Example 5 | TMSPi | 5 |
| Example 6 | TMSB | 1 |
| Example 7 | TMSB | 2 |
| Example 8 | TMSB | 3 |
| Example 9 | TMSB | 4 |
| Example 10 | TMSB | 5 |

COMPARATIVE EXAMPLE 1

An electrolyte solution was prepared in accordance with the same procedure as in above-mentioned examples, except that the compound represented by Formula 1 was not added.

COMPARATIVE EXAMPLE 2

An electrolyte solution was prepared in accordance with the same procedure as in Example 1, except that 5 wt % of tris(trimethylsilyl)phosphate was used instead of the compound in Example 1.

COMPARATIVE EXAMPLE 3

An electrolyte solution was prepared in accordance with the same procedure as in Example 1, except that 1 wt % TMSP was used instead of the compound in Example 1.

COMPARATIVE EXAMPLE 4

An electrolyte solution was prepared in accordance with the same procedure as in Example 1, except that 2 wt % TMSP was used instead of the compound in Example 1.

Production of Rechargeable Lithium Battery

A positive active material of $LiCoO_2$, a binder of polyvinylidene fluoride (PVDF), and a conductive agent of carbon were mixed at a weight ratio of 92:4:4, then were dispersed in N-methyl-2-pyrrolidone to provide a positive electrode slurry. The provided slurry was coated on an aluminum foil at a thickness of 20 μm, dried, and compressed to provide-a positive electrode.

A negative active material of crystalline synthetic graphite, and a binder of PVDF were mixed at a weight ratio of 92:8, then dispersed in N-methyl-2-pyrrolidone to provide a negative electrode slurry. The provided slurry was coated on a 15 μm copper foil, dried, and compressed to provide a negative electrode.

A 25 μm polyethylene material was interposed between these electrodes as a separator. They were spiral-wound, compressed, and input in 30 mm×48 mm×6 mm prismatic cans, then the electrolyte solutions prepared from Examples 1 to 10 and Comparative Examples 1 and 2 were respectively input therein to provide 18650 coin-type battery cells.

Measurement for Resistance of Rechargeable Lithium Battery-Cell

Measurement of AC Impedance (Alternating-Current Impedance: ACI)

Rechargeable lithium battery cells including the electrolytes according to Examples 1-3, 5-10 and Comparative Example 1 were subjected to standing under an atmosphere of a state of charge (SOC) of 60% at a temperature of −30° C. for 6 hours, then measured to determine AC impedance while scanning to 50 mHz-100 kHz. Herein, the amplitude of the AC current was 10 mV, and the DC potential of the battery cell was 3.74 V. The results are shown in FIGS. 2 and 3.

Figure 2:
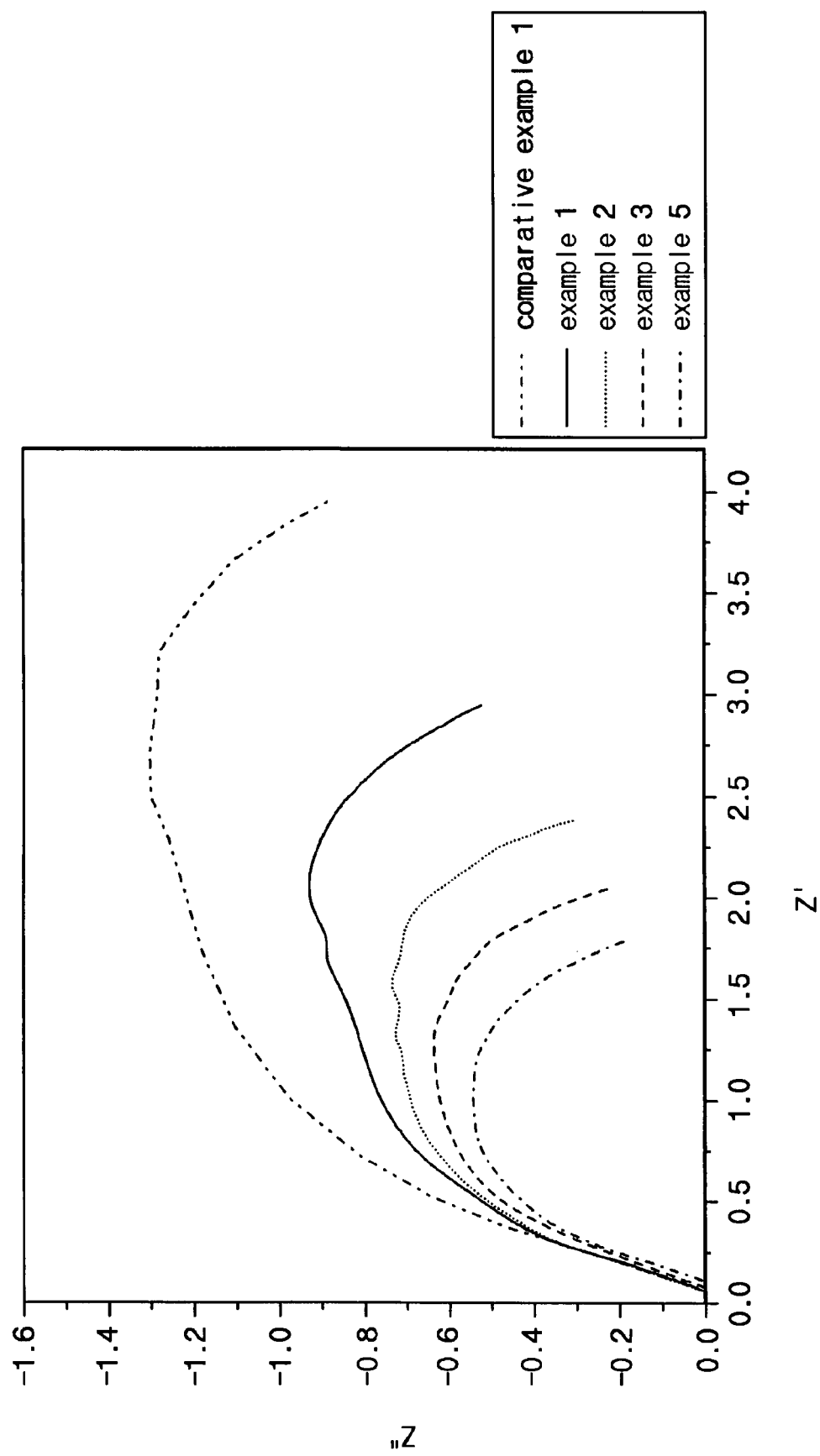
FIG. 2 is a graph showing measurement results of alternating-current impedance (ACI) of cells including the electrolytes according to Examples 1-3 and 5, and Comparative Example 1.
Figure 3:
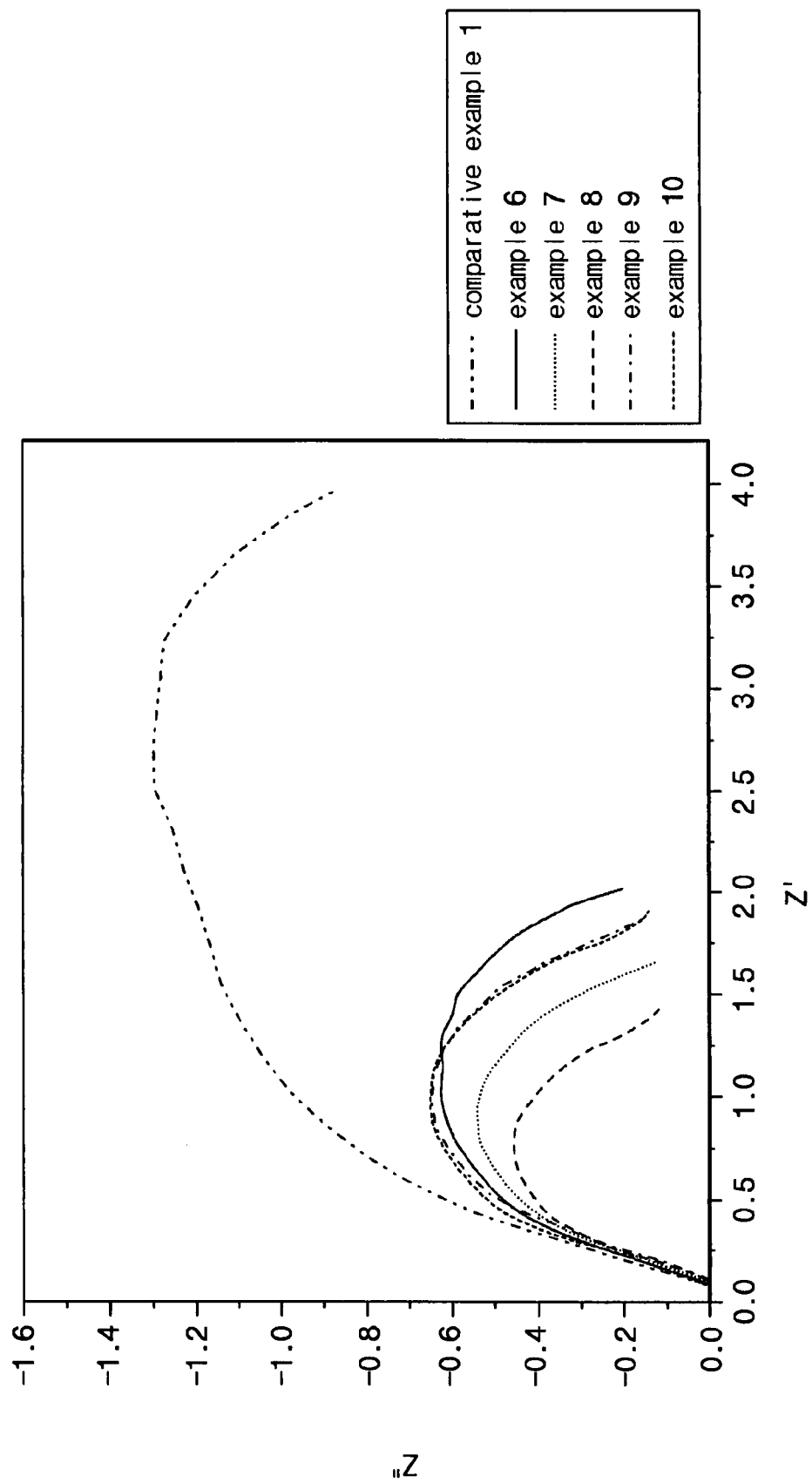
FIG. 3 is a graph showing measurement results of ACI of cells including the electrolytes according to Examples 6-10, and Comparative Example 1.

FIG. 2 is a graph showing measurement results of ACI of cells including the electrolytes according to Examples 1-3 and 5, and Comparative Example 1, and FIG. 3 is a graph showing measurement results of ACI of cells including the electrolytes according to Examples 6-10 and Comparative Example 1.

Referring to the graphs of FIGS. 2 and 3, the intersection with the X axis is the Ohm resistance of the battery cell, and the increasing and decreasing curve shows the resistance due to the SEI formed on the surface of electrode plate. That is, the smaller the curve, the more the resistance induced by the SEI.

As shown in FIGS. 2 and 3, battery cells including the electrolytes including TMSPi according to Examples 1-3 and 5 and battery cells including the electrolytes including TMSB according to Examples 6-10 show the SEI and the excellent charge-transfer resistance reduction. Particularly, the resistance reduction is most improved in the electrolyte including 5 wt % TMPSi based on total weight of electrolyte according to Example 5 and in the electrolyte including 3 wt % of TMSB based on total weight of electrolyte according to Example 8.

2) Measurement of DC Internal Resistance (DCIR)

Rechargeable lithium battery cells including electrolytes according to Examples 1-3, 5-10, and Comparative Example 1 were subjected to standing under the 60% SOC atmosphere at a temperature of −30° C. for 6 hours, then discharged at a 5 C constant current discharge (discharge pulse current value: 1 A, pulse time: 2 seconds). The battery voltages were measured every 0.1 seconds. Herein, the DC potential of the battery was 3.74V and the cut-off lower limit was 2V. The results are shown in FIGS. 4 and 5.

Figure 4:
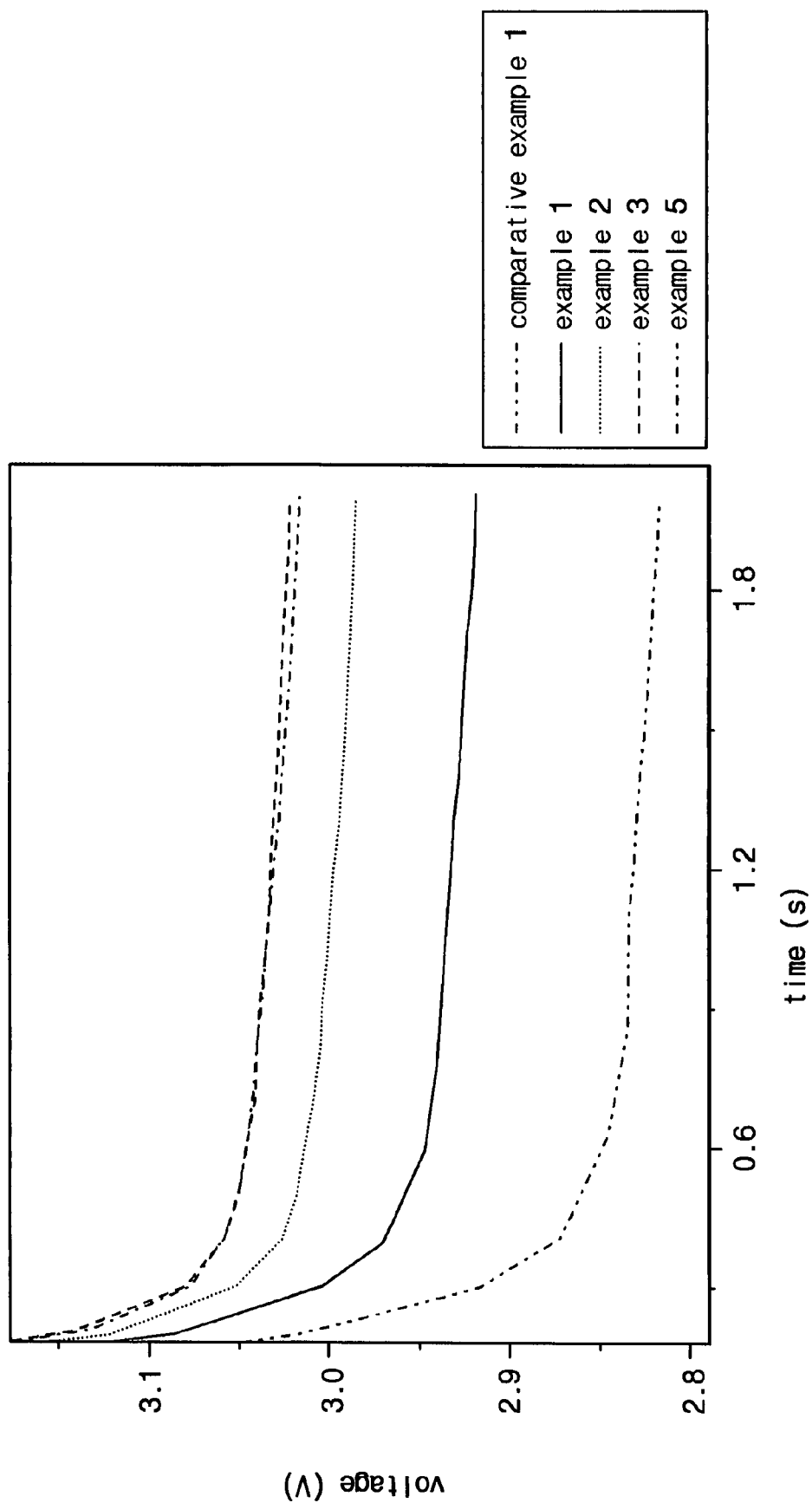
FIG. 4 is a graph showing measurement results of direct-current internal resistance (DCIR) of cells including the electrolytes according to Examples 1-3 and 5, and Comparative Example 1.

FIG. 4 is a graph showing measurement results of direct-current internal resistance (DCIR) of cells including the electrolytes according to Examples 1-3 and 5, and Comparative Example 1. FIG. 5 is a graph showing measurement results of DCIR of cells including the electrolytes according to Examples 6-10, and Comparative Example 1.

Figure 5:
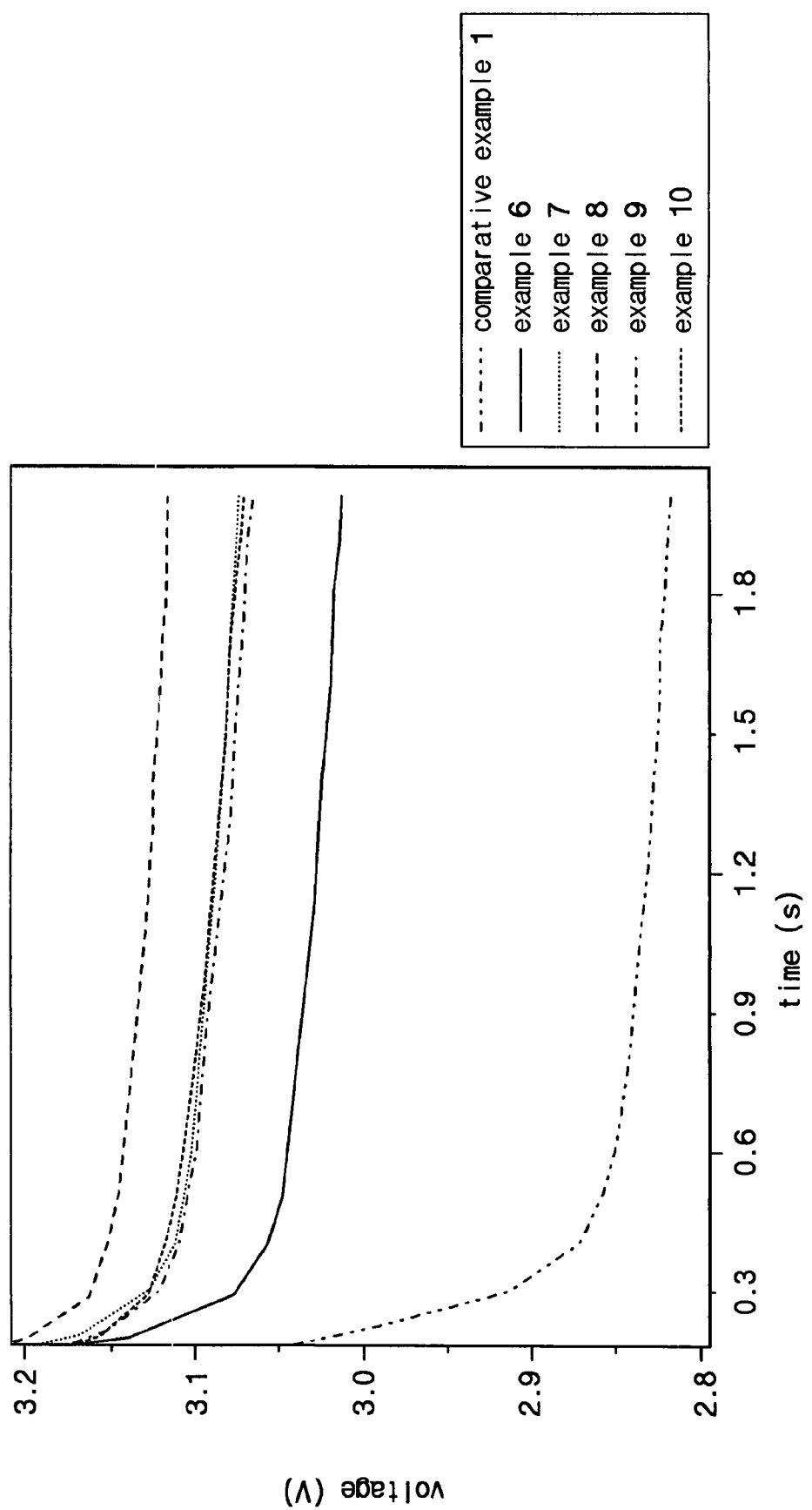
FIG. 5 is a graph showing measurement results of DCIR of cells including the electrolytes according to Examples 6-10, and Comparative Example 1.

As shown in FIGS. 4 and 5, cells including electrolyte including TMSPi according to Examples 1-3 and 5 and those including TMSB according Examples 6-10 decreased the voltage drop, which is anticipated to result in an excellent output density. Particularly, the electrolyte including 5 wt % or 3 wt % of TMSPi based on total weight of electrolyte according to Example 5 or Example 3 and the electrolyte including 3 wt % of TMSB based on the total weight of electrolyte according to Example 8 had the best voltage drop effect.

Measurement of Low Temperature Power (LT Power) of Rechargeable Lithium Battery

Rechargeable lithium battery cells including electrolytes according to Examples 5, 8, and Comparative Examples 1 and 2 were charged at −30° C., an initial voltage of 3.74V, and a 5 C constant current discharge for 2 seconds, then measured for the LT Power based on the low temperature discharge. The results are shown in the following Table 2.

LT Power can be calculated from the following Equation 1.

$$P = I * V_{lim}(V_{ocv} - V_{lim})/(V_{ocv} - V_{2s}),$$

wherein P refers to a low-temperature power, I refers to a current at 1 A, $V_{lim}$ refers to a lower limit of 2V in cut-off voltage, $V_{ocv}$ refers to open circuit voltage (3.74V) of cells at the initial point of each discharge pulse, and $V_{2s}$ refers to battery voltage at the end point of each pulse.

TABLE 2

|  | LT Power (W/cell) |
| --- | --- |
| Comparative Example 1 | 3.74 |
| Comparative Example 3 | 4.58 |
| Comparative Example 4 | 4.76 |
| Example 2 | 4.97 |
| Example 3 | 4.94 |
| Example 6 | 4.90 |
| Example 7 | 5.35 |

As shown in Table 2, rechargeable lithium battery cells including the compounds according to Examples 2, 3, 6, and 7 show more increased output characteristics than that including no additives according to Comparative Example 1 and those including TMSP according to Comparative Examples 3 and 4. Particularly, the rechargeable lithium battery cell including the electrolyte including 2 wt % of TMSB according to Example 7 had the most improved output characteristic.

Rechargeable lithium battery cells including electrolytes according to Examples 4, 8, and Comparative Examples 1 and 2 were discharged at −30° C., an initial voltage of 3.74V, and a 5 C constant current, and measured for ACI and DCIR in accordance to the same procedure as above. The results are shown in FIGS. 6 and 7.

Figure 6:
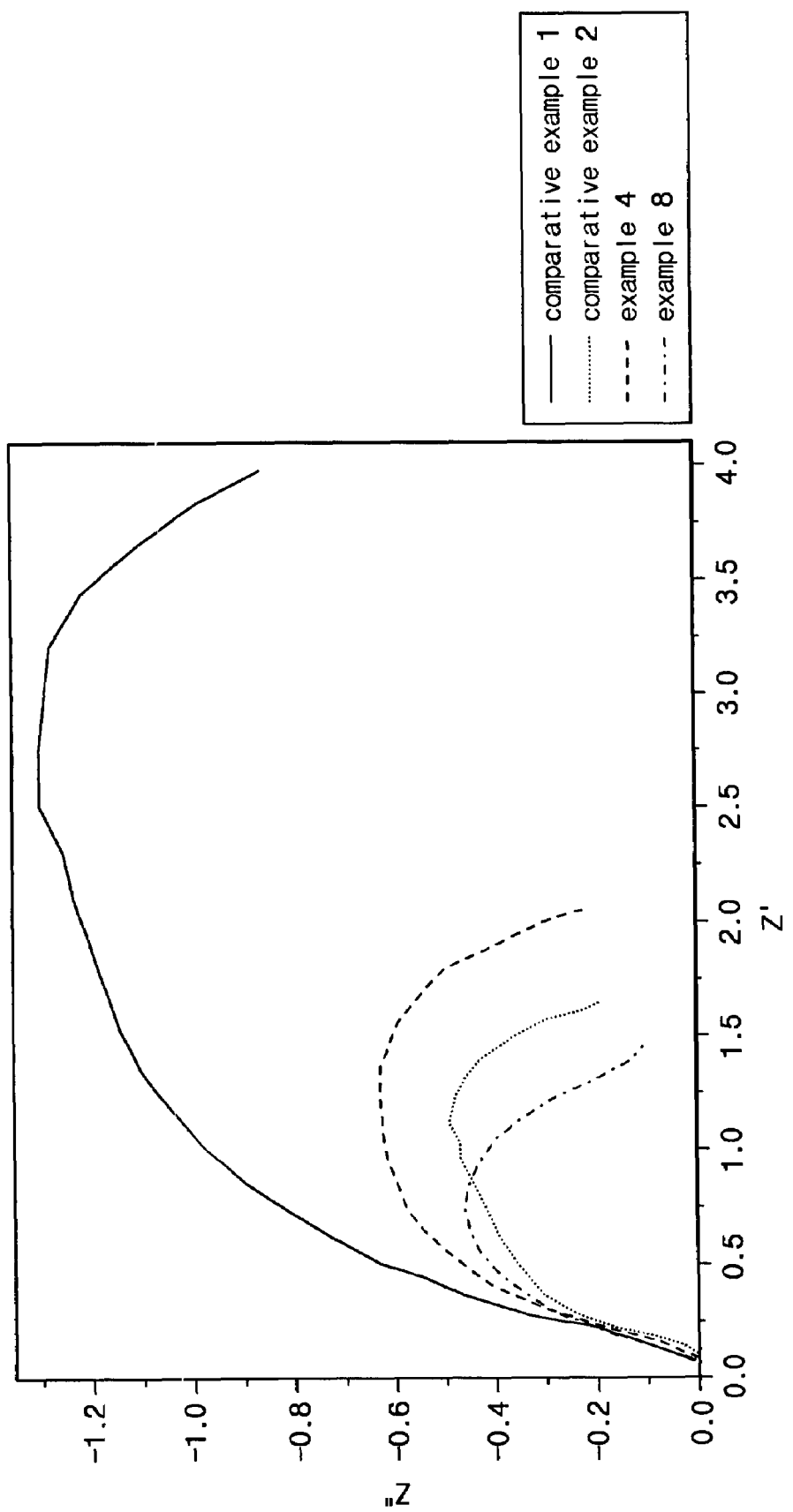
FIG. 6 is a graph showing measurement results of ACI at a low temperature of cells including the electrolytes according to Examples 4 and 8, and Comparative Examples 1 and 2.

FIG. 6 is a graph showing measurement results of LT ACI of cells including the electrolytes according to Examples 4 and 8, and Comparative Examples 1 and 2. FIG. 7 is a graph showing measurement results of LT DCIR of cells including the electrolytes according to Examples 4 and 8, and Comparative Examples 1 and 2.

As shown in FIGS. 6 and 7, rechargeable lithium battery cells including the compounds according to Examples 4 and 8 had decreased internal resistance and increased output density compared to that including the electrolyte including no additives according to Comparative Example 1.

The cell including TMSPi according to Example 4 showed relatively excellent internal resistance and output characteristics, but had relatively high resistance and low output density compared to the cell including the electrolyte including TMSP according to Comparative Example 2. On the other hand, the cell including TMSB according to Example 8 had superior internal resistance and output characteristics to those of the cell including TMSP according to Comparative Example 2.

The electrolyte according to one embodiment of the present invention is decomposed at a high rate discharge at a low temperature earlier than an organic solvent, so it is possible to provide an SEI layer on the surface of the negative electrode. Thereby, decomposition of the organic solvent is suppressed. The SEI layer formed on the surface of the negative electrode facilitates lithium ion intercalation on the surface of the negative electrode so that the internal resistance of the battery is decreased to improve the electrochemical characteristics of the battery. The rechargeable lithium battery including the electrolyte has an excellent cycle-life characteristic, temperature characteristic, and high rate discharge characteristic as well as charge and discharge characteristic.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrolyte for a rechargeable lithium battery, comprising:

a compound represented by Formula 1:

$$A[OSi(C_mH_{2m+1})_3]_3 \tag{1}$$

wherein A is P, and m is an integer ranging from 0 to 6;
a lithium salt; and
a non-aqueous organic solvent.

2. The electrolyte of claim 1, wherein the compound represented by Formula 1 comprises at least one selected from the group consisting of tris(trimethylsilyl) phosphite, tris(triethylsilyl) phosphite, tris(trimethylsilyl) borate, tris(triethylsilyl) borate, and mixtures thereof.

3. The electrolyte of claim 1, wherein the compound represented by Formula 1 is present in an amount of 0.01 to 10 wt % based on the total weight of the electrolyte.

4. The electrolyte of claim 1, wherein the lithium salt comprises at least one selected from the group consisting of $LiPF_6$, $LiBF_4$, $LiSbF_6$, $LiAsF_6$, $LiClO_4$, $LiCF_3SO_3$, $LiC_4F_9SO_3$, $LiN(CF_3SO_2)_2$, $LiN(C_2F_5SO_2)_2$, $LiAlO_4$, $LiAlCl_4$, $LiN(C_pF_{2p+1}SO_2)(C_qF_{2q+q}SO_2)$ where p and q are natural numbers, $LiSO_3CF_3$, LiCl, LiI, and combinations thereof.

5. The electrolyte of claim 1, wherein the lithium salt is present at a concentration of 0.7 to 2M.

6. The electrolyte of claim 1, wherein the non-aqueous organic solvent comprises at least one selected from the group consisting of a carbonate-based solvent, an ester-based solvent, an ether-based solvent, and a ketone-based solvent, and mixtures thereof, and optionally an aromatic hydrocarbon-based solvent.

7. The electrolyte of claim 1, wherein the non-aqueous organic solvent comprises a carbonate-based solvent comprised of a mixture of a cyclic carbonate and a linear carbonate in a volume ratio of 1:1 to 1:9.

8. The electrolyte of claim 7, wherein the cyclic carbonate comprises at least one selected from the group consisting of ethylene carbonate, propylene carbonate, butylene carbonate, γ-butyrolactone, and mixtures thereof, and the linear carbonate comprises at least one selected from the group consisting of dimethyl carbonate, diethyl carbonate, dipropyl carbonate, methylpropyl carbonate, ethylpropyl carbonate, methylethyl carbonate, and mixtures thereof.

9. The electrolyte of claim 7, wherein the non-aqueous organic solvent comprises the carbonate-based solvent and the aromatic hydrocarbon-based solvent.

10. The electrolyte of claim 9, wherein the carbonate-based solvent and the aromatic hydrocarbon-based solvent are in a volume ratio of 1:1 to 30:1.

11. The electrolyte of claim 9, wherein the aromatic hydrocarbon-based solvent is represented by Formula 2:

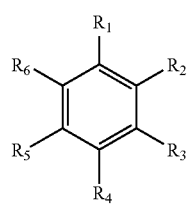

(2)

wherein $R_1$ to $R_6$ are independently selected from the group consisting of hydrogen, a halogen, a C1 to C10 alkyl, a haloalkyl, and combinations thereof.

12. A rechargeable lithium battery, comprising a positive electrode including a positive active material capable of reversibly intercalating and deintercalating lithium ions;

a negative electrode including a negative active material capable of reversibly intercalating and deintercalating lithium ions; and an electrolyte comprising:

a compound represented by Formula 1:

$$A[OSi(C_mH_{2m+1})_3]_3 \tag{1}$$

wherein A is P, and m is an integer ranging from 0 to 6;
a lithium salt; and
a non-aqueous organic solvent.

13. The rechargeable lithium battery of claim 12, wherein the compound represented by Formula 1 comprises at least one selected from the group consisting of tris(trimethylsilyl) phosphite, tris(triethylsilyl) phosphite, tris(trimethylsilyl) borate, tris(triethylsilyl) borate, and mixtures thereof.

14. The rechargeable lithium battery of claim 12, wherein the compound represented by Formula 1 is present in an amount of 0.01 to 10 wt % based on the total weight of the electrolyte.

15. The rechargeable lithium battery of claim 12, wherein the lithium salt comprises at least one selected from the group consisting of $LiPF_6$, $LiBF_4$, $LiSbF_6$, $LiAsF_6$, $LiClO_4$, $LiCF_3SO_3$, $LiC_4F_9SO_3$, $LiN(CF_3SO_2)_2$, $LiN(C_2F_5SO_2)_2$, $LiAlO_4$, $LiAlCl_4$, $LiN(C_pF_{2p+1}SO_2)(C_qF_{2q+1}SO_2)$ where p and q are natural numbers, $LiSO_3CF_3$, LiCl, LiI, and combinations thereof.

16. The rechargeable lithium battery of claim 12, wherein the lithium salt is present at a concentration of 0.7 to 2M.

17. The rechargeable lithium battery of claim 12, wherein the non-aqueous organic solvent comprises at least one selected from the group consisting of a carbonate-based solvent, an ester-based solvent, an ether-based solvent, and a ketone-based solvent, and mixtures thereof, and optionally an aromatic hydrocarbon-based solvent.

18. The rechargeable lithium battery of claim 12, wherein the non-aqueous organic solvent comprises a carbonate-based solvent comprised of a mixture of a cyclic carbonate and a linear carbonate in a volume ratio of 1:1 to 1:9.

19. The rechargeable lithium battery of claim 18, wherein the cyclic carbonate comprises at least one selected from the group consisting of ethylene carbonate, propylene carbonate, butylene carbonate, γ-butyrolactone, and mixtures thereof, and the linear carbonate comprises at least one selected from the group consisting of dimethyl carbonate, diethyl carbonate, dipropyl carbonate, methylpropyl carbonate, ethylpropyl carbonate, methylethyl carbonate, and mixtures thereof.

20. The rechargeable lithium battery of claim 18, wherein the non-aqueous organic solvent comprises the carbonate-based solvent and the aromatic hydrocarbon-based solvent.

21. The rechargeable lithium battery of claim 20, wherein the carbonate-based solvent and the aromatic hydrocarbon-based solvent are in a volume ratio of 1:1 to 30:1.

22. The rechargeable lithium battery of claim 20, wherein the aromatic hydrocarbon-based solvent is represented by Formula 2:

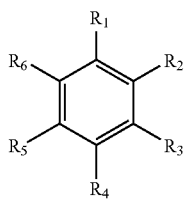

(2)

wherein $R_1$ to $R_6$ are independently selected from the group consisting of hydrogen, a halogen, a C1 to C10 alkyl, a haloalkyl, and combinations thereof.

23. The rechargeable lithium battery of claim 12, wherein the negative active material is at least one selected from the group consisting of a carbonaceous material, a metal being capable of alloying lithium, a composite of a metal and a carbonaceous material, and mixtures thereof.

24. The rechargeable lithium battery of claim 12, wherein the positive active material is selected from the group consisting of compounds represented by Formulas 4 to 28:

$$Li_aA_{1-b}B_bD_2 \quad (4)$$

wherein, in Formula 4, $0.95 \leq a \leq 1.1$ and $0 \leq b \leq 0.5$;

$$Li_aE_{1-b}B_bO_{2-c}F_c \quad (5)$$

wherein, in Formula 5, $0.95 \leq a \leq 1.1$, $0 \leq b \leq 0.5$, and $0 \leq c \leq 0.05$;

$$LiCo_{2-b}O_{4-c}F_c \quad (6)$$

wherein, in Formula 6, $0 \leq b \leq 0.5$ and $0 \leq c \leq 0.05$;

$$LiMn_{2-b}O_{4-c}F_c \quad (7)$$

wherein, in Formula 7, $0 \leq b \leq 0.5$, and $0 \leq c \leq 0.05$;

$$Li_aNi_{1-b-c}Co_bB_cD_\alpha \quad (8)$$

wherein, in Formula 8, $0.95 \leq a \leq 1.1$, $0 \leq b \leq 0.5$, $0 \leq c \leq 0.05$, and $0 < \alpha \leq 2$;

$$Li_aNi_{1-b-c}CO_bO_{2-\alpha}F_\alpha \quad (9)$$

wherein, in Formula 9, $0.95 \leq a \leq 1.1$, $0 \leq b \leq 0.5$, $0 \leq c \leq 0.05$, and $0 < \alpha < 2$;

$$Li_aNi_{1-b-c}Co_bO_{2-\alpha}F_2 \quad (10)$$

wherein, in Formula 10, $0.95 \leq a \leq 1.1$, $0 \leq b \leq 0.5$, and $0 \leq c \leq 0.05$;

$$Li_aNi_{1-b-c}Mn_bB_cD_\alpha \quad (11)$$

wherein, in Formula 11, $0.95 \leq a \leq 1.1$, $0 \leq b \leq 0.5$, $0 \leq c \leq 0.05$, and $0 < \alpha \leq 2$;

$$Li_aNi_{1-b-c}Mn_bO_{2-\alpha}F_\alpha \quad (12)$$

wherein, in Formula 12, $0.95 \leq a \leq 1.1$, $0 \leq b \leq 0.5$, $0 \leq c \leq 0.05$, and $0 < \alpha < 2$;

$$Li_aNi_{1-b-c}Mn_bO_{2-\alpha}F_2 \quad (13)$$

wherein, in Formula 13, $0.95 \leq a \leq 1.1$, $0 \leq b \leq 0.5$, and $0 \leq c \leq 0.05$;

$$Li_aNi_bE_cG_dO_2 \quad (14)$$

wherein, in Formula 14, $0.90 \leq a \leq 1.1$, $0 \leq b \leq 0.9$, $0 \leq c \leq 0.5$, and $0.001 \leq d \leq 0.1$;

$$Li_aNi_bCo_cMn_dG_eO_2 \quad (15)$$

wherein, in Formula 15, $0.90 \leq a \leq 1.1$, $0 \leq b \leq 0.9$, $0 \leq c \leq 0.5$, $0 \leq d \leq 0.5$, and $0.001 \leq e \leq 0.1$;

$$Li_aNiG_bO_2 \quad (16)$$

wherein, in Formula 16, $0.90 \leq a \leq 1.1$ and $0.001 \leq b \leq 0.1$;

$$Li_aCoG_bO_2 \quad (17)$$

wherein, in Formula 17, $0.90 \leq a \leq 1.1$ and $0.001 \leq b \leq 0.1$;

$$Li_aMnG_bO_2 \quad (18)$$

wherein, in Formula 18, $0.90 \leq a \leq 1.1$ and $0.001 \leq b \leq 0.1$;

$$Li_aMn_2G_bO_4 \quad (19)$$

wherein, in Formula 19, $0.90 \leq a \leq 1.1$ and $0.001 \leq b \leq 0.1$;

$$HO_2; \quad (20)$$

$$HS_2; \quad (21)$$

$$LiHS_2; \quad (22)$$

$$V_2O_5; \quad (23)$$

$$LiV_2O_5; \quad (24)$$

$$LiIO_2; \quad (25)$$

$$LiNiVO_4; \quad (26)$$

$$Li_{3-f}J_2(PO_4)_3 \; (0 \leq f \leq 3) \quad (27); \text{ and}$$

$$Li_{3-f}Fe_2(PO_4)_3 \; (0 \leq f \leq 2); \quad (28)$$

wherein, in Formulas 4 to 28, A is selected from the group consisting of Ni, Co, Mn, and combinations thereof, B is selected from the group consisting of Al, Ni, Co, Mn, Cr, Fe, Mg, Sr, V, a rare earth element, and combinations thereof, D is selected from the group consisting of O, F, S, P, and combinations thereof, E is selected from the group consisting of Co, Mn, and combinations thereof, F is selected from the group consisting of F, S, P, and combinations thereof, G is selected from the group consisting of Al, Cr, Mn, Fe, Mg, La, Ce, Sr, V, lanthanide element, and combinations thereof, Q is selected from the group consisting of Ti, Mo, Mn, and combinations thereof, I is selected from the group consisting of Cr, V, Fe, Sc, Y, and combinations thereof, and J is selected from the group consisting of V, Cr, Mn, Co, Ni, Cu, and combinations thereof.

25. The rechargeable lithium battery of claim 12, wherein the rechargeable lithium battery is a lithium ion battery or a lithium polymer battery.

* * * * *